US012103811B2

(12) United States Patent
Freitag et al.

(10) Patent No.: US 12,103,811 B2
(45) Date of Patent: Oct. 1, 2024

(54) LENGTH-ADJUSTABLE CABLE DEVICE FOR WIRING AN AIRCRAFT CABIN

(71) Applicants: Klaus-Udo Freitag, Hamburg (DE); Yener Palit, Hamburg (DE)

(72) Inventors: Klaus-Udo Freitag, Hamburg (DE); Yener Palit, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 891 days.

(21) Appl. No.: 17/185,210

(22) Filed: Feb. 25, 2021

(65) Prior Publication Data

US 2021/0269276 A1   Sep. 2, 2021

(30) Foreign Application Priority Data

Feb. 28, 2020   (DE) .......................... 102020105354.1

(51) Int. Cl.
*B65H 75/42*  (2006.01)
*B65H 75/44*  (2006.01)
*H02G 11/02*  (2006.01)

(52) U.S. Cl.
CPC ....... *B65H 75/425* (2013.01); *B65H 75/4428* (2013.01); *H02G 11/02* (2013.01); *B65H 2701/34* (2013.01)

(58) Field of Classification Search
CPC .............. B65H 75/425; B65H 75/4428; B65H 2701/34; H02G 11/02; B64D 11/00; B64D 11/0624
See application file for complete search history.

(56) References Cited

U.S. PATENT DOCUMENTS

2017/0225789 A1\*   8/2017   Silva ..................... B60N 2/0725
2017/0260021 A1\*   9/2017   Hale ...................... B65H 75/14

\* cited by examiner

*Primary Examiner* — Robert J McCarry, Jr.
(74) *Attorney, Agent, or Firm* — Greer, Burns & Crain, Ltd.

(57) ABSTRACT

A length-adjustable cable device for wiring an aircraft cabin includes a cable and a cable drum with a cylindrical wall which is arranged around an axis of rotation and has an outwardly facing rolling-up surface. The first end of the cable is fastened to or arranged on the cable drum in such a manner that the first connection provided at the first end can be connected to a corresponding connection of another cable device. The cable is wound up onto the rolling-up surface in such a manner that it is unwound from the rolling-up surface by rotation of the cable drum about the axis of rotation thereof when the second end is moved away from the cable drum. The cable drum is configured for fastening to a cabin component of an aircraft cabin.

12 Claims, 3 Drawing Sheets

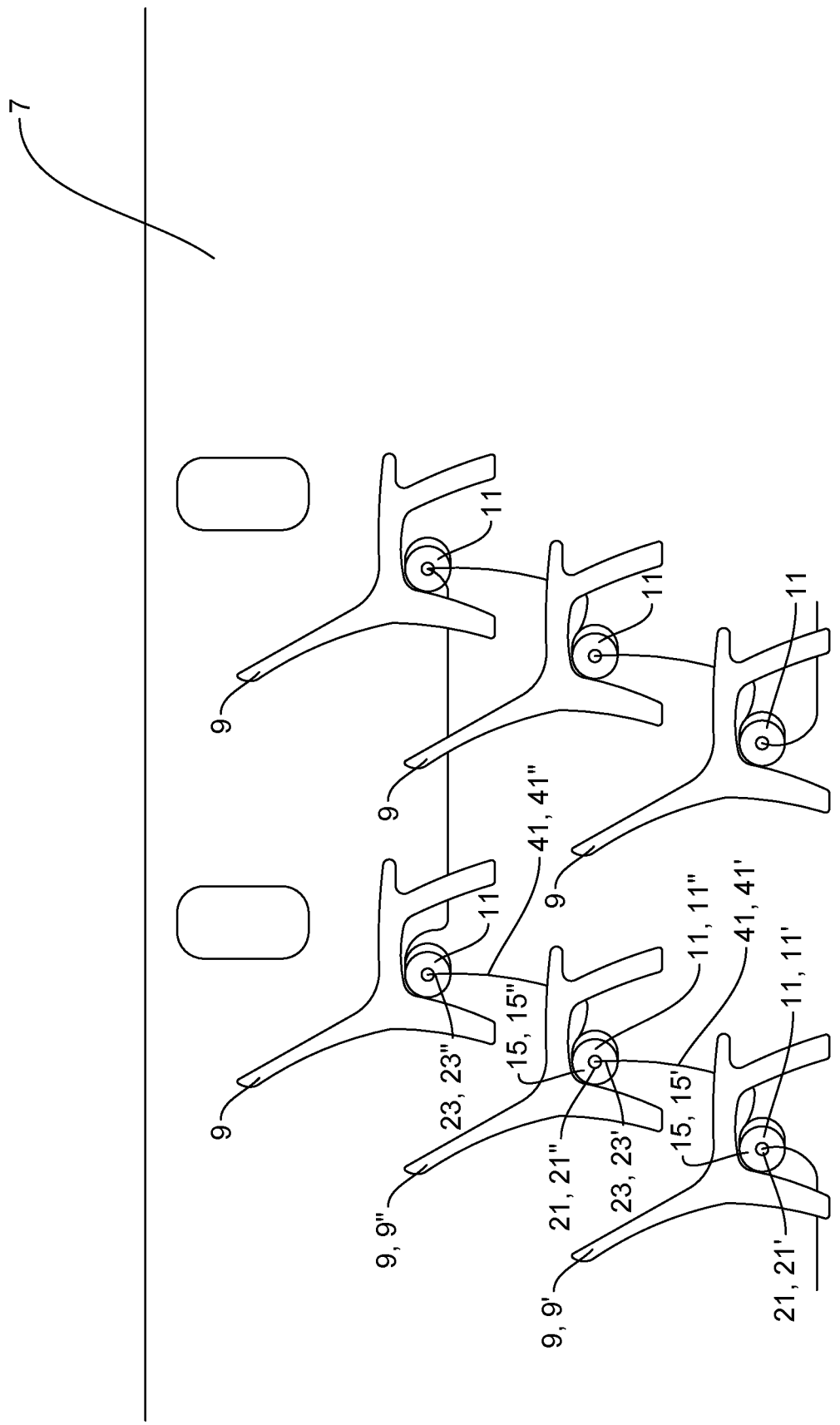

LENGTH-ADJUSTABLE CABLE DEVICE FOR WIRING AN AIRCRAFT CABIN

CROSS-REFERENCES TO RELATED APPLICATIONS

This application claims the benefit of the German patent application No. 102020105354.1 filed on Feb. 28, 2020, the entire disclosures of which are incorporated herein by way of reference.

FIELD OF THE INVENTION

The present invention relates to a length-adjustable cable device, in particular for wiring an aircraft cabin. However, the cable device can also be used for wiring other aircraft parts outside the cabin or other locations outside an aircraft that make an adaptation of the length necessary. Further aspects of the present invention relate to an aircraft cabin arrangement with such a cable device, to an aircraft with such a cable device or with such an aircraft cabin arrangement, and to the use of such a cable device.

BACKGROUND OF THE INVENTION

In aircraft cabins, cabin components, such as seats, walls or monuments, frequently have to be wired to one another. At the same time, the space division in aircraft cabins is frequently also changed retrospectively, i.e., after the original installation, in order to adapt the aircraft cabin to changing use requirements, with the positions of the cabin components being changed. In this case, the cable connections of the cabin components also have to be adapted, which is normally very complicated. In addition, different customer requirements also necessitate different space divisions, in particular different seat distances, in aircraft cabins of otherwise identical types of aircraft, as a result of which a retrospective adaptation of the cable connections can likewise become necessary.

SUMMARY OF THE INVENTION

It is therefore an object of the present invention to provide a cable device with which the wiring of an aircraft cabin can easily be adapted in the event of a retrospective change in the positions of cabin components.

This object is achieved by a length-adjustable cable device. The cable device comprises a cable and a cable drum. The cable has a first end and an opposite second end, wherein the first end has a first connection and the second end has a second connection. The first connection and the second connection have, preferably, standardized plugs. The cable drum has a cylindrical wall which is arranged in a preferably rotationally symmetrical manner about an axis of rotation and has an outwardly facing, preferably cylindrical rolling-up surface. The wall or the rolling-up surface is preferably formed continuously in the circumferential direction, but can also be interrupted, for example, by gaps or openings, or can have a structured, corrugated or other type of irregular or changeable profile in the circumferential direction. The first end of the cable is fastened to or arranged on the cable drum in such a manner that the first connection can be connected to a corresponding connection of another cable device. The cable is wound up onto the rolling-up surface in such a manner that it is unwound from the rolling-up surface by rotation of the cable drum about the axis of rotation thereof when the second end is moved away from the cable drum. The cable drum is configured for fastening to a component of the use location, in particular to a cabin component of an aircraft cabin, preferably with a corresponding fastening device. The cabin component can be, for example, a seat, a wall or a monument.

With such a cable device, the wiring of cabin components in an aircraft cabin can be very easily adapted when the positions of the cabin components are changed. This is because when the cable drum is fastened by the first end of the cable to a cabin component, for example under the seat surface of a passenger seat, the second end of the cable can be pulled off from the cable drum flexibly as far as necessary by rotation of the cable drum in order to achieve a corresponding connection of a further cable device to another cabin component, for example an adjacent passenger seat, to which the second connection is intended to be connected. Owing to the flexibly adjustable cable length, the cable device according to the invention also makes it possible for a cabin component to be moved with a cable device fastened thereto while the cable device is connected to other cable devices or connections.

In a preferred embodiment, the cable is in the form of a ribbon cable, i.e., it comprises a flat, ribbon-shaped, flexible, electrically insulating carrier material in which a plurality of strip conductors are embedded next to one another. The ribbon cable can also comprise flexible printed circuits (FPC). The ribbon cable, because of the flat shape and high degree of flexibility, is readily suitable for wiring the cabin and can be rolled up onto the cable drum in a simple and space-saving manner.

In a further preferred embodiment, the cable drum has a holder for fastening to the cabin component of the aircraft cabin. Such a holder can be, for example, a clamping holder, a screwed holder or a snap-in holder. Alternatively or additionally, a holder for fastening the cable device can also be provided or integrated on the cabin component.

In a further preferred embodiment, the cable drum has a fixed part and a rotatable part. The fixed part extends along the axis of rotation, preferably has the holder and is configured to be fastened to the cabin component of the aircraft cabin, preferably with the holder, in such a manner that the axis of rotation is fixed in relation to the cabin component. The rotatable part comprises the wall including the rolling-up surface and is arranged coaxially around the fixed part and is mounted on the latter so as to be rotatable about same and thus about the axis of rotation.

In a further preferred embodiment, the cable has a first cable section and a second cable section. The wall has an opening, preferably a slot, for passing the cable, in particular without a joint, from the rolling-up surface to an inner region which is surrounded by the wall and faces away from the rolling-up surface. The cable is wound up onto the cable drum in such a manner that the cable between the first and second cable section is guided through the opening. The first cable section is wound up here in a first winding direction in the inner region and the second cable section is wound up on the rolling-up surface in a second winding direction opposite to the first winding direction such that, when the second end is moved away from the cable drum and the cable drum is thereby rotated about the axis of rotation and the second cable section is unwound from the cable drum, the first cable section is also unwound, or the winding is relaxed or released, by rotation of the cable drum. It can thereby be ensured that, by rotation of the cable drum as the second end is pulled off, the first end with the first connection is not twisted and possibly damaged.

It is particularly preferred here if the first cable section is wound up in the inner region on an inner surface of the wall, the inner surface facing the inner region. The winding of the first cable section is preferably relaxed or released here during rotation of the cable drum about the axis of rotation.

Alternatively, it is preferred if the first cable section is wound up in the inner region on the outside around a rolling-up device of the fixed part, for example a rod or another cylindrical surface. The first cable section is unwound here from the rolling-up device during rotation of the cable drum about the axis of rotation.

In a preferred embodiment, the cable drum has a pretensioning device between the rotatable part and the fixed part, preferably in the form of a spring which is designed to pretension the rotatable part in relation to the fixed part in a direction in which the cable, in particular the second cable section, is wound up onto the rolling-up surface. That is to say, the pretensioning device is pretensioned when the cable is pulled off at the second end from the cable drum. Such a pretensioning device has the advantage that the cable is always tensioned in the mounted state, and therefore kinks are avoided and a minimum space is taken up. In addition, the winding up of the cable is facilitated.

In a further preferred embodiment, the cable drum has a locking device for selectively locking the rotatable part in relation to the fixed part. The locking device can be adjusted here between a locking position, in which a movement of the rotatable part in relation to the fixed part is blocked, and a released position, in which a movement of the rotatable part in relation to the fixed part is possible. By means of such a locking device, a predefined, fixed length of the unwound cable between the second end and the cable drum can be set and maintained.

It is particularly preferred here if the locking device can be adjusted between the locking position and the released position by actuation of a switch. The locking device can thereby be adjusted in a particularly simple manner.

Alternatively, it is preferred if the locking device can be adjusted between the locking position and the released position by an abrupt movement of the rotatable part in relation to the fixed part, for example by abrupt pulling on the second cable section. The locking device can thereby be adjusted in a likewise particularly simple manner.

A further aspect of the present invention relates to an aircraft cabin arrangement. The aircraft cabin arrangement comprises an aircraft cabin, a multiplicity of cabin components, in particular seats, walls or monuments, which are arranged spaced apart from one another in the aircraft cabin, and a cable device, preferably a multiplicity of cable devices, according to one of the previously described embodiments, wherein the cable drum is fastened to a cabin component.

In a preferred embodiment, the aircraft cabin arrangement comprises a first cable device according to one of the previously described embodiments and a second cable device according to one of the previously described embodiments. The cable drum of the first cable device is fastened to a first cabin component, in particular, under the seat surface of a passenger seat. The cable drum of the second cable device is fastened to a second cabin component, in particular, under the seat surface of an adjacent passenger seat. The second connection of the first cable device is connected to the first connection of the second cable device, wherein preferably the second cable section of the first cable device is pulled out of the cable drum. Further cable devices are preferably connected in the same manner to the first and second cable device. For example, such a cable device according to the invention could be fastened under each passenger seat of the aircraft cabin and connected to one another as described above. The features and effects described in conjunction with the cable device are vis-à-vis also provided in the case of the aircraft cabin arrangement.

A further aspect of the present invention relates to an aircraft with a cable device according to one of the previously described embodiments, or with an aircraft cabin arrangement according to one of the previously described embodiments. The features and effects described in conjunction with the cable device and the aircraft cabin arrangement are vis-à-vis also provided in the case of the aircraft.

A further aspect of the present invention relates to the use of a cable device according to one of the previously described embodiments for wiring various cabin components in an aircraft cabin, wherein preferably the cable drum is fastened to a cabin component. The features and effects described in conjunction with the cable device are vis-à-vis also provided in the case of the use thereof.

BRIEF DESCRIPTION OF THE DRAWINGS

A preferred exemplary embodiment of the present invention will be explained in more detail below with reference to a drawing. In the drawing FIG. 3 shows a schematic detail of an aircraft cabin arrangement according to an embodiment of the invention.

DETAILED DESCRIPTION OF THE PREFERRED EMBODIMENTS

Figure 1:
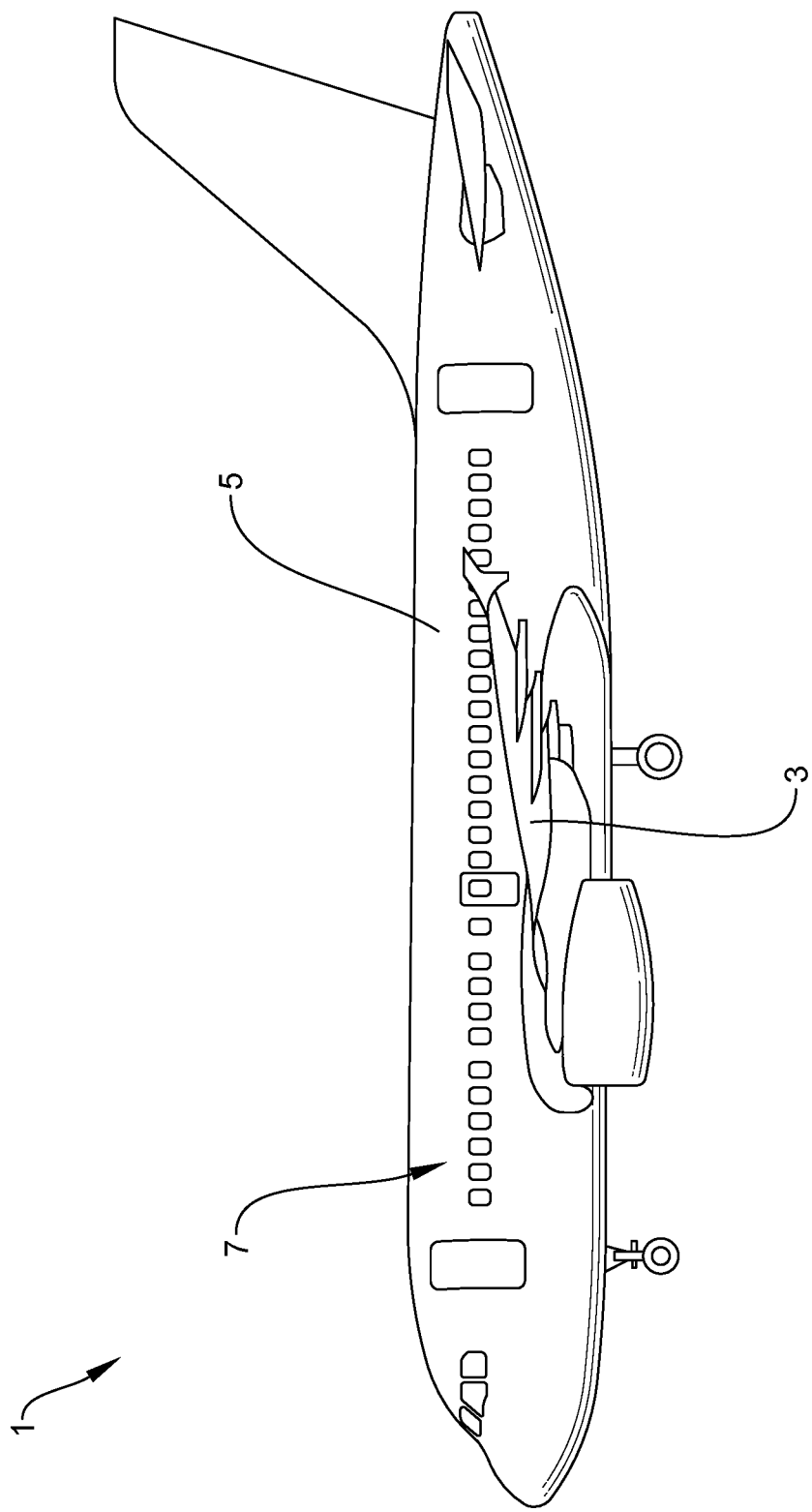
FIG. 1 shows a perspective view of an aircraft according to an embodiment of the invention.

FIG. 1 illustrates an aircraft 1 according to the invention. The aircraft 1 comprises wings 3 and a fuselage 5. An aircraft cabin 7, part of which is illustrated in FIG. 3, is provided within the fuselage 5. In the aircraft cabin 7, a multiplicity of cabin components 9, in the present case passenger seats, are arranged spaced apart from one another and are wired with length-adjustable cable devices 11 according to the invention. Such a cable device 11 is illustrated by way of example in FIGS. 2a and 2b.

Figure 2A:
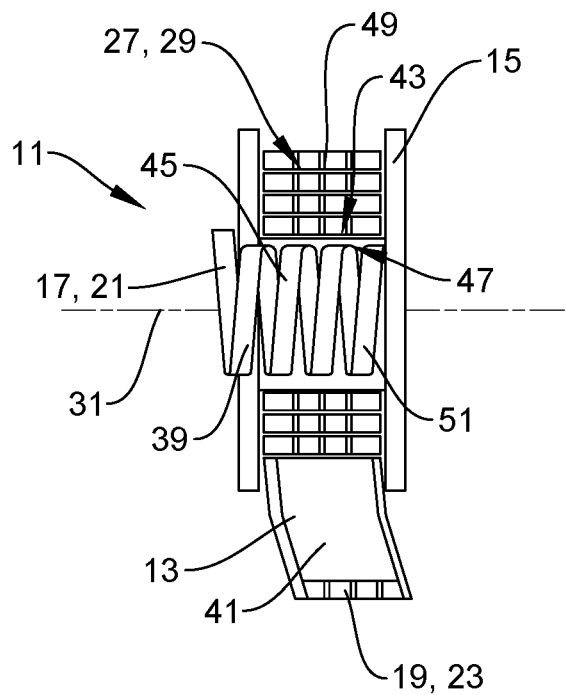
FIGS. 2a and 2b show a side view (FIG. 2a) and front view (FIG. 2b) of a cable device according to an embodiment of the invention.
Figure 2B:
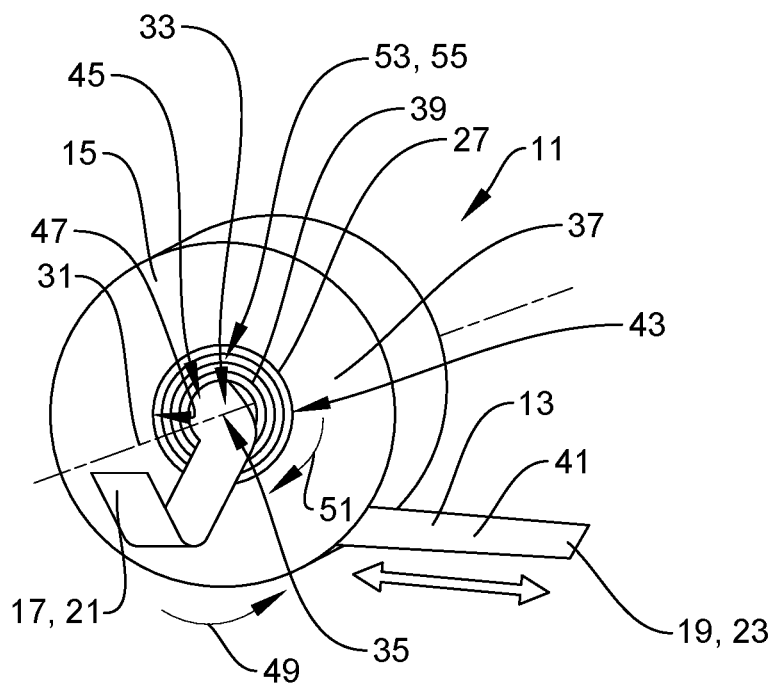

The length-adjustable cable device 11 shown in FIGS. 2a and 2b comprises a cable 13, in the present exemplary embodiment a ribbon cable, and a cable drum 15. The cable 13 has a first end 17 and an opposite second end 19, wherein the first end 17 has a first connection 21 and the second end 19 has a second connection 23. The cable drum 15 has a cylindrical wall 27 which is arranged around an axis of rotation 31 and has an outwardly facing rolling-up surface 29. The first end 17 of the cable 13 is fastened to or arranged on the cable drum 15 in such a manner that the first connection 21 can be connected to a corresponding connection of another cable device 11. The cable 13 is wound up onto the rolling-up surface 29 in such a manner that it is unwound from the rolling-up surface 29 by rotation of the cable drum 15 about the axis of rotation 31 thereof when the second end 19 is moved away from the cable drum 15. The cable drum 15 has a holder 33 for fastening to the cabin component 9 of the aircraft cabin 7.

The cable drum 15 furthermore has a fixed part 35 and a rotatable part 37. The fixed part 35 extends along the axis of rotation 31, has the holder 33 and is configured to be fastened with the holder 33 to the cabin component 9 of the aircraft cabin 7 in such a manner that the axis of rotation 31 is fixed in relation to the cabin component 9. The rotatable part 37 by contrast comprises the wall 27 including the rolling-up surface 29 and is arranged coaxially around the fixed part 35 and is mounted on the latter so as to be rotatable about same and thus about the axis of rotation 31.

The cable 13 has a first cable section 39 and a second cable section 41. The wall 27 has a slot-shaped opening 43 for passing the cable 13 from the rolling-up surface 29 to an inner region 45 surrounded by the wall 27. The cable 13 is wound up onto the cable drum 15 in such a manner that the cable 13 between the first and second cable section 39, 41 is guided through the opening 43. In this case, the first cable section 39 is wound up in a first winding direction 49 in the inner region 45 on an inner surface 47 of the wall 27 facing the inner region 45, and the second cable section 41 is wound up on the rolling-up surface 29 in a second winding direction 51 opposite to the first winding direction 49. As a result, when the second end 19 is moved away from the cable drum 15 and the cable drum 15 is thereby rotated about the axis of rotation 31 and the second cable section 41 is pulled off from the cable drum 15, the winding of the first cable section 39 is also relaxed or released by rotation of the cable drum 15 such that, by rotation of the cable drum 15 during the pulling-off of the second end 19, the first end 17 with the first connection 21 is not twisted.

Between the rotatable part 37 and the fixed part 35, the cable drum 15 has a pretensioning device 53 in the form of a spring which is designed to pretension the rotatable part 37 in relation to the fixed part 35 in a direction in which the cable 13 is wound up on the rolling-up surface 29.

Furthermore, the cable drum 15 has a locking device 55 for selectively locking the rotatable part 37 in relation to the fixed part 35. The locking device 55 here can be adjusted between a locking position, in which a movement of the rotatable part 37 in relation to the fixed part 35 is blocked, and a released position, in which a movement of the rotatable part 37 in relation to the fixed part 35 is possible. The locking device 55 can be adjusted between the locking position and the released position by an abrupt movement of the rotatable part 37 in relation to the fixed part 35, for example by abrupt pulling on the second cable section 41.

FIG. 3 shows the use of the previously described cable device 11, shown in FIGS. 2a and 2b, in the aircraft cabin 7 for wiring the cabin components 9 arranged therein, i.e., the passenger seats. A multiplicity of cable devices 11, inter alia a first cable device 11' and a second cable device 11", which are designed as previously described, are arranged in the aircraft cabin 7. The cable drum 15' of the first cable device 11' is fastened to a first cabin component 9', namely under the seat surface of a first passenger seat. The cable drum 15" of the second cable device 11" is fastened to a second cabin component 9", namely under the seat surface of an adjacent second passenger seat. The second connection 23' of the first cable device 11' is connected to the first connection 21" of the second cable device 11", wherein the second cable section 41' of the first cable device 11' is pulled out of the cable drum 15'. Furthermore, further cable devices 11 are connected in the same manner to the first and second cable device 11', 11".

With such a cable device 11, the wiring of cabin components 9 in an aircraft cabin 7 can be very easily adapted if the positions of the cabin components 9 are changed.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A length-adjustable cable device for wiring an aircraft cabin, comprising
    a cable with a first end and an opposite second end, wherein the first end has a first connection and the second end has a second connection,
    a cable drum with a cylindrical wall which is arranged around an axis of rotation and has an outwardly facing rolling-up surface,
    wherein the first end of the cable is fastened to or arranged on the cable drum such that the first connection can be connected to a corresponding connection of another cable device,
    wherein the cable is wound up onto the rolling-up surface such that the cable is unwound from the rolling-up surface by rotation of the cable drum about the axis of rotation thereof when the second end is moved away from the cable drum,
    wherein the cable drum is configured to fasten to a cabin component of an aircraft cabin,
    wherein the cable drum has a holder configured to fasten to the cabin component of the aircraft cabin,
    wherein the cable drum has a fixed part and a rotatable part,
    wherein the fixed part extends along the axis of rotation, has the holder and is configured to be fastened to the cabin component of the aircraft cabin such that the axis of rotation is fixed in relation to the cabin component,
    wherein the rotatable part comprises the wall and is arranged coaxially around the fixed part and is mounted on the latter to be rotatable about same,
    wherein the cable has a first cable section and a second cable section,
    wherein the wall has an opening for passing the cable from the rolling-up surface to an inner region surrounded by the wall,
    wherein the cable is wound up onto the cable drum such that the cable between the first and second cable section is guided through the opening, and
    wherein the first cable section is wound up in a first winding direction in the inner region and the second cable section is wound up on the rolling-up surface in a second winding direction opposite to the first winding direction.

2. The cable device according to claim 1, wherein the cable is formed as a ribbon cable.

3. The cable device according to claim 1, wherein the first cable section is wound up in the inner region on an inner surface of the wall.

4. The cable device according to claim 1, wherein the first cable section is wound up in the inner region around a rolling-up device of the fixed part.

5. The cable device according to claim 1, wherein the cable drum has a pretensioning device which is configured to pretension the rotatable part in relation to the fixed part in a direction in which the cable is wound up onto the rolling-up surface.

6. The cable device according to claim 1,
wherein the cable drum has a locking device to selectively lock the rotatable part in relation to the fixed part,
wherein the locking device can be adjusted between a locking position, in which a movement of the rotatable part in relation to the fixed part is blocked, and a released position, in which the movement of the rotatable part in relation to the fixed part is possible.

7. The cable device according to claim 6, wherein the locking device is adjustable between the locking position and the released position by actuation of a switch.

8. The cable device according to claim 6, wherein the locking device is adjustable between the locking position and the released position by an abrupt movement of the rotatable part in relation to the fixed part.

9. An aircraft cabin arrangement, comprising
an aircraft cabin,
a multiplicity of cabin components which are arranged spaced apart from one another in the aircraft cabin, and
a cable device according to claim 1,
wherein the cable drum is fastened to one of the cabin components.

10. The aircraft cabin arrangement according to claim 9, wherein the cable device comprises two such cable devices,
in a first of the cable devices, the cable drum is fastened to a first cabin component,
in a second of the cable devices, the cable drum is fastened to a second cabin component,
wherein the second connection of the first cable device is connected to the first connection of the second cable device.

11. An aircraft with an aircraft cabin arrangement according to claim 9.

12. An aircraft with a cable device according to claim 1.

* * * * *